US 8,683,317 B2

(12) United States Patent
Caldwell et al.

(10) Patent No.: US 8,683,317 B2
(45) Date of Patent: Mar. 25, 2014

(54) DYNAMICALLY LINKED GRAPHICAL MESSAGES FOR PROCESS CONTROL SYSTEMS

(75) Inventors: John M. Caldwell, Austin, TX (US); Cindy A. Scott, Georgetown, TX (US)

(73) Assignee: Fisher-Rosemount Systems, Inc., Round Rock, TX (US)

(*) Notice: Subject to any disclaimer, the term of this patent is extended or adjusted under 35 U.S.C. 154(b) by 258 days.

(21) Appl. No.: 12/883,330

(22) Filed: Sep. 16, 2010

(65) Prior Publication Data

US 2011/0072382 A1  Mar. 24, 2011

Related U.S. Application Data

(60) Provisional application No. 61/245,096, filed on Sep. 23, 2009.

(51) Int. Cl.
*G06F 17/00* (2006.01)
(52) U.S. Cl.
USPC .......................................... 715/230; 715/780
(58) Field of Classification Search
USPC ................................................ 715/230, 780
See application file for complete search history.

(56) References Cited

U.S. PATENT DOCUMENTS

| | | | |
|---|---|---|---|
| 6,691,280 B1 * | 2/2004 | Dove et al. ..................... | 715/210 |
| 7,010,752 B2 | 3/2006 | Ly | |
| 7,191,400 B1 | 3/2007 | Buvac et al. | |
| 7,599,748 B2 | 10/2009 | Dove et al. | |
| 2003/0103071 A1 | 6/2003 | Lusen et al. | |
| 2003/0182168 A1 | 9/2003 | Lyons | |
| 2004/0199925 A1 * | 10/2004 | Nixon et al. ................... | 719/315 |
| 2005/0055628 A1 | 3/2005 | Chen et al. | |
| 2005/0091027 A1 | 4/2005 | Zaher et al. | |
| 2005/0091578 A1 * | 4/2005 | Madan et al. .................. | 715/512 |
| 2006/0218501 A1 | 9/2006 | Wilson et al. | |
| 2006/0239248 A1 | 10/2006 | Hawk et al. | |

(Continued)

FOREIGN PATENT DOCUMENTS

| | | |
|---|---|---|
| EP | 1 526 463 A1 | 4/2005 |
| GB | 2 430 499 A | 3/2007 |
| WO | WO-00/07110 A1 | 2/2000 |
| WO | WO-2010/010967 A1 | 1/2010 |

OTHER PUBLICATIONS

U.S. Appl. No. 12/565,275, filed Sep. 23, 2009, Caldwell et al.

(Continued)

*Primary Examiner* — Shen Shiau
(74) *Attorney, Agent, or Firm* — Marshall, Gerstein & Borun LLP

(57) ABSTRACT

Methods and systems for providing dynamically linked graphical messages in a process control system are disclosed. A dynamically linked graphical message may include a hyperlink and an electronic sticky note image. At run-time of a display view, the hyperlink may be established between contents of the electronic sticky note image and a process control object, and the electronic sticky note image may be displayed proximate to a representation of the process control object. The electronic sticky note image may automatically be displayed on any display view (displayed on any computing device in communication with the process control system) that includes a representation of the process control object or corresponding sub-class object. The contents of the electronic sticky note image may be stored separately from configurations of the process control object and the display view. User interfaces for administering and displaying properties of dynamically linked graphical messages are also disclosed.

41 Claims, 7 Drawing Sheets

(56) References Cited

U.S. PATENT DOCUMENTS

| | | |
|---|---|---|
| 2007/0285721 A1 | 12/2007 | Sato |
| 2008/0022195 A1 | 1/2008 | Lyle et al. |
| 2008/0046490 A1 | 2/2008 | Williams et al. |
| 2008/0136833 A1* | 6/2008 | Taniguchi et al. ............ 345/581 |
| 2008/0155444 A1 | 6/2008 | Pannese et al. |
| 2008/0189364 A1* | 8/2008 | Landon et al. ................ 709/204 |
| 2009/0055737 A1* | 2/2009 | Borchardt et al. ............ 715/708 |
| 2010/0095198 A1 | 4/2010 | Bultrowicz et al. |

OTHER PUBLICATIONS

Great Britain Search Report for Application No. GB1015891.3, dated Jan. 21, 2011.

* cited by examiner

| | ID | Creation Time Stamp | Process Control Object | Central DB Location | Category | Additional Info |
|---|---|---|---|---|---|---|
| 320 | 0000 | 8:03 AM 5/16/07 | Valve Model #6081 | Electronic Logbook Entry # 6379 | Safety Procedure | |
| 322 | 1111 | 10:42 AM 5/16/07 | Instance "B" of Display View #48 | Electronic Logbook Entry # 7920 | Operator Notes | |
| | | | | | | |
| | ... | | | | | |
| 325 | nnnn | 10:42 AM 8/28/07 | Alarm 73A | Event Historian Entry # 4622 | Operator Notes | I noticed when... |

302 — ID
305 — Creation Time Stamp
308 — Process Control Object
310 — Central DB Location
312 — Category
315 — Additional Info
300

*FIG. 3A*

DYNAMICALLY LINKED GRAPHICAL MESSAGES FOR PROCESS CONTROL SYSTEMS

CROSS REFERENCE TO RELATED APPLICATIONS

This application claims the benefit of U.S. Provisional Application No. 61/245,096, entitled "Dynamically Linked Graphical Messages for Process Control Systems" which was filed on Sep. 23, 2009, the entire disclosure of which is hereby incorporated by reference herein.

FIELD OF THE DISCLOSURE

The present disclosure generally relates to dynamically linked graphical messages in process control systems, and in particular, dynamically linked electronic sticky notes for display, storage and use in process control systems.

BACKGROUND

Process control systems, like those used in chemical, petroleum or other process control plants, typically include one or more process controllers and input/output (I/O) devices communicatively coupled to at least one host or operator workstation and to one or more field devices via analog, digital or combined analog/digital busses. The field devices, which may be, for example, valves, valve positioners, switches and transmitters (e.g., temperature, pressure and flow rate sensors), perform functions within a process such as opening or closing valves and measuring process parameters. The process controllers receive signals indicative of process measurements made by the field devices and/or other information pertaining to the field devices, use this information to implement a control routine, and then generate control signals that are sent over the busses or other communication lines to the field devices to control the operation of the process. In this manner, the process controllers may execute and coordinate control strategies using the field devices via the busses and/or other communication links communicatively coupling the field devices.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc.

As an example, the DeltaV™ control system, sold by Fisher Rosemount Systems, Inc., includes multiple applications stored within and executed by different devices located at diverse places within a process plant. A configuration application, which resides in one or more operator workstations, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Configuration applications may include objects from a library of template objects, such as function block template objects and, in some cases, control module template objects. These configuration applications are used to configure a control strategy for a process plant. The template objects have default properties, settings and methods associated therewith and the engineer using the configuration application can select these template objects and essentially place copies of the selected template objects into a configuration screen to develop a control module. During the process of selecting and placing the template objects into the configuration screen, the engineer interconnects the inputs and outputs of these objects and changes their parameters, names, tags and other properties to create process control objects that are interconnected and included in a specific control module for a specific use in the process plant. After creating one or more such control modules, the engineer can then instantiate the control module and download it to the appropriate controller or controllers and field devices for execution during operation of the process plant.

Thereafter, the engineer generally creates one or more displays for operators, maintenance personnel, etc. within the process plant by selecting and building display objects in a display creation application. These displays are typically implemented on a system wide basis in one or more of the workstations and provide preconfigured displays to the operator or maintenance persons regarding the operating state of the control system or the devices within the plant. Typically, these displays take the form of alarming displays that receive and display alarms generated by controllers or devices within the process plant, control displays indicating the operating state of the controllers and other devices within the process plant, maintenance displays indicating the functioning state of the devices within the process plant, etc. These displays are generally preconfigured to display, in known manners, information or data received from the process control modules or the devices within the process plant. In some known systems, displays are created through the use of process control objects that have a graphic associated with a physical or logical element and that is communicatively tied to the physical or logical element to receive data about the physical or logical element. The object may change the graphic on the display screen based on the received data to illustrate, for example, that a tank is half full, to illustrate the flow measured by a flow sensor, etc.

Similar to the control configuration application, a display creation application has template graphical display items, such as tanks, valves, sensors, operator control buttons like slide bars, on/off switches, etc. which may be placed on a screen in any desired configuration to create an operator display, maintenance display and the like. When placed onto the screen, individual graphic items may be interconnected on the screen in a manner that provides some information or display of the inner-workings of the process plant to different users. Each individual graphic item may be associated with an object and/or a class of objects.

In a process control plant using a process control system, operators and/or other process control plant personnel often need to communicate information regarding a particular control loop, function block, device or other physical or logical process control element to safely, efficiently and profitably operate the process control plant. Communication may need to occur, for example, between plant personnel located in different parts of the plant or working different shifts. This information may be manually delivered through hand-written notes in a paper logbook or via physical sticky notes placed on an operator console. Manual message delivery methods, while quick and convenient, may often result in the operator communications being overlooked, lost, not easily located or not easily referenced or distributed to necessary parties.

Alternatively, communication of information between operators may occur via electronic logbooks, email, or other electronic media or methods. Compared to manual methods, electronic methods of communication of information between operators or plant personnel may be more permanent and not as easily lost, however, electronic methods may provide different types of inconveniences. For example, in order to send an email including contents from both an electronic logbook entry and an associated section in an device specification manual with regard to a faulty device, an operator may need to run applications that are not co-resident on or co-accessible from the operator's control console. The operator is forced to determine which application must be run and where the application or associated data is located, thus taking the operator's time, attention, and in some cases even physical presence away from the operator's primary tasks at hand. Moreover, the scope and timing of electronic communication distribution is still largely dependent on each individual message sender. The incongruence of determining contents and recipients as well as searching for, accessing, and distributing messages, applications and data may result not only in operator inconvenience, but also may result in a potentially dangerous situation, for example, if the operator is distracted away from the operator's plant operation responsibilities.

SUMMARY OF THE DISCLOSURE

This summary is provided to introduce a selection of concepts in a simplified form that are further described below in the detailed description. This summary is not intended to identify key features or essential features of the claimed subject matter, nor is it intended to be used to limit the scope of the claimed subject matter.

The present disclosure provides embodiments of methods and systems in a process control system for providing dynamically linked graphical messages. A dynamically linked graphical message may be created for use in the process control system. The dynamically linked graphical message may include an electronic sticky note image on a display screen, and the electronic sticky note image may include a field containing, for example, a description, a title or other contents. The dynamically linked graphical message may also include a hyperlink that may substantiate an association of the contents of the electronic sticky note image to a specific process control object in the process control system. Typically, the process control object has been defined and configured in the process control system using an object oriented programming protocol.

Once the dynamically linked graphical message is created, its corresponding hyperlink between the specific process control object and the contents of the electronic sticky note may be activated at run-time of display view including the specific process control object, and the activated hyperlink may allow the electronic sticky note to be automatically displayed in the vicinity of a representation of the specific process control object whenever and wherever the representation of the specific process control object is displayed. In particular, any display view presented on any operator workstation or any other computing device in communication with the process control plant that includes a representation of the specific process control object may also include the electronic sticky note image displayed proximate to the representation. Thus, a single, initial creation of the dynamically linked graphical message may result in a perpetuation of an automatic display of the electronic sticky note in conjunction with any run-time displayed instance of the linked, specific process control object throughout the entire process control plant and any associated computing devices.

The dynamically linked graphical message may not require a process control system configuration change or download for its definition, creation, activation or execution. Rather, the dynamically linked graphical message may be defined, created, activated and/or executed during run-time, such as during a run-time of a display view that includes a process control object corresponding to the dynamically linked graphical message. For example, the dynamically linked graphical message may be defined so that its contents are stored in a centralized database (e.g., event database, historian database, electronic logbook, document repository, knowledge object database, etc.) that is accessible to the process control system and that is not a configuration database or a storage location of the specific process control object. At run-time of a display view including the specific process control object, a hyperlink between the stored content and the specific process control object may be established, and a corresponding electronic sticky note image may be included on the display view. When the dynamically linked graphical message is deleted, the corresponding electronic sticky note image may be removed from the display view and the hyperlink may be disabled, but the contents of the dynamically linked graphical message may still be maintained in the centralized database.

In one example, the contents of the dynamically linked graphical message may be stored as a particular type of electronic logbook entry in an electronic logbook entry database. The particular type may distinguish the electronic logbook entry as a dynamically linked graphical message. The contents of the dynamically linked graphical message may only be a portion of the electronic logbook entry. Additional information, such as author identification, creation date, expiration date, message detail, and the like may also be stored in the logbook entry. Some or all of the additional information may be visible to a user in response to a user-interaction with a corresponding electronic sticky note image on the display, for example, after a user clicks on or mouses-over the electronic sticky note, or after the user initiates some other action, such as accessing a touch screen, initiating a cursor action, or initiating a voice-activated command mechanism. Additionally or alternatively, the user may also access and interact with the dynamically linked graphical message via standard electronic logbook interfaces.

Dynamically linked graphical messages and process control systems supporting dynamically linked graphical messages may have characteristics that may provide operators and process control plant personnel with ease of use and convenience. Examples may include the ability to turn on or off the visibility of all dynamically linked graphical messages; authorization privileges for viewing, modification and/or other capabilities; expiration dates; appearance manipulation; and visual differentiation between different types or categories of dynamically linked graphical messages, to name a few. Additionally, the present disclosure provides a set of operations for administering dynamically linked graphical messages.

BRIEF DESCRIPTION OF THE DRAWINGS

FIG. 3A illustrates an embodiment of a dynamically linked graphical message database in a process control system;

DETAILED DESCRIPTION

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

Figure 1:
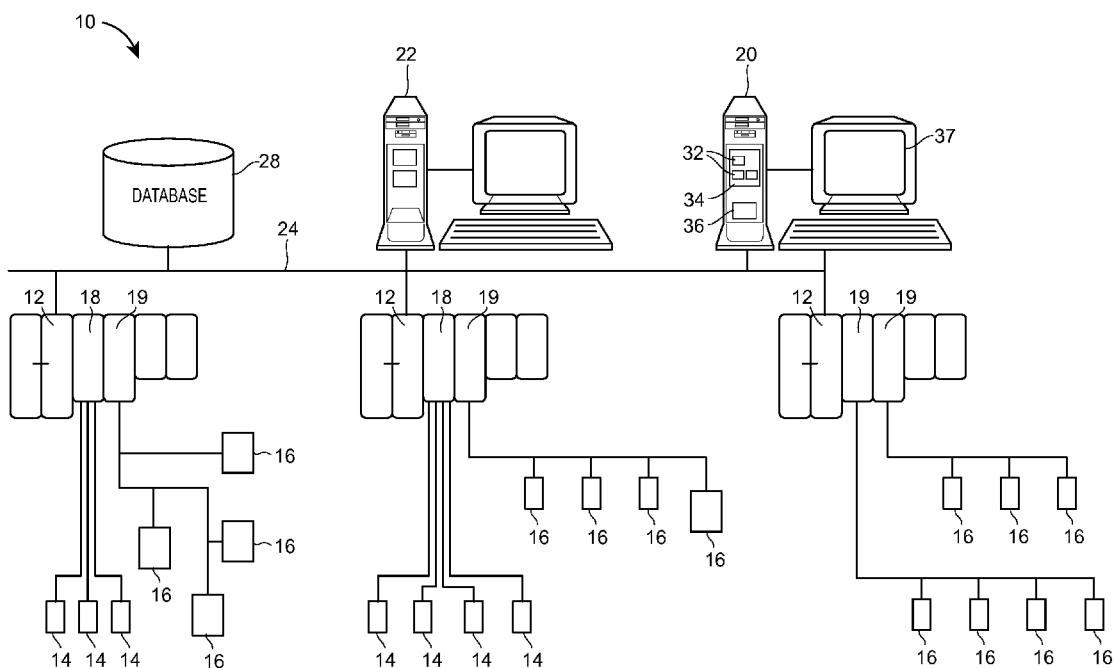
FIG. 1 is block diagram of an exemplary distributed process control system in a process control plant.

Referring now to FIG. 1, a process plant 10 includes a distributed process control system having one or more process controllers 12, which may be a pair of redundant controllers. Each process controller 12 is connected to one or more field devices 14 and 16 via input/output (I/O) cards or devices 18 and 19, which may be any types of I/O devices conforming to any desired communication or controller protocol. The field devices 14 and 16 may be any types of field devices such as, for example, sensors, valves, transmitters, positioners, etc., and may conform to any desired open, proprietary, or other communication or programming protocol.

The process plant 10 also includes one or more host workstations, computers, or user interfaces 20 and 22 (which may be any type of personal computers, workstations, etc.) that are accessible by plant personnel such as configuration engineers, process control operators, maintenance personnel, etc. The user interfaces 20 and 22 are coupled to the process controllers 12 via a communication line or bus 24. The communication bus 24 may be implemented using any desired hardwired or wireless communication structure, and using any desired or suitable communication protocol such as, for example, an Ethernet protocol. The process controllers 12, the I/O devices 18 and 19, and the field devices 14 and 16 generally make up the process control system.

In addition, a database 28 may be connected to the communication bus 24, and operates as a data historian that collects and stores parameter, status and other data associated with the process controllers 12 and field devices 14 and 16 within the plant 10. Alternatively, or in addition, the database 28 may operate as a configuration database that stores the current configuration of the process control system within the plant 10 (and configuration data related thereto) used by the process controllers 12 and the workstations 20, 22. The database 28 may also serve as a data historian by collecting and storing data generated in the process plant 10 for future use. Although FIG. 1 illustrates only one database 28, multiple databases are possible, such as an event historian database and a continuous process historian database.

While the process controllers 12, the I/O devices 18 and 19 and the field devices 14 and 16 are typically located down within and distributed throughout the sometimes harsh plant environment, the user interfaces 20 and 22 and the database 28 are usually located in control rooms or other less harsh environments easily accessible by operators or maintenance personnel. As is known, each of the process controllers 12, which may be for example, the DeltaV™ controller sold by Emerson Process Management, stores and executes a controller application that implements a control strategy using a number of different, independently executed control modules or blocks. The control modules may each be made up of what are commonly referred to as function blocks. Each function block is a part or a subroutine of an overall control routine and operates in conjunction with other function blocks (via communications called links) to implement process control loops within the process plant 10.

As is well known, function blocks, which may be objects in an object-oriented programming protocol, typically perform one of an input function, such as that associated with a transmitter, a sensor or other process parameter measurement device, a control function, such as that associated with a control routine that performs PID (proportional, integral and derivative) control routines, fuzzy logic, etc. control, or an output function, which controls the operation of some device, such as a valve, to perform some physical function within the process plant 10. Of course, hybrid and other types of complex function blocks exist such as model predictive controllers (MPCs), optimizers, etc. While the Fieldbus protocol and the DeltaV system protocol use control modules and function blocks designed and implemented in an object-oriented programming protocol, the control modules could be designed using any desired control programming scheme including, for example, sequential function blocks, ladder logic, etc., and are not limited to being designed using function blocks or any other particular programming technique.

In the process plant 10 illustrated in FIG. 1, the field devices connected to the process controllers 12 may be conventional (i.e., non-smart) field devices 14 such as, for example, standard 4-20 mA devices that communicate over analog or combined analog and digital lines to the I/O device 18. Alternatively or in addition, the field devices may be smart field devices 16 having a processor and a memory such as, for example, FOUNDATION® Fieldbus field devices that communicate over a digital bus to the I/O device 19 using Fieldbus protocol communications. Smart field devices 16 may store and execute modules, or sub-modules such as function blocks associated with the control strategy implemented in the controllers 12. Function blocks, which may be disposed in two different ones of the Fieldbus field devices 16, may be executed in conjunction with the execution of the control modules within the process controllers 12 to implement process control, as is well known. Of course, the field devices 14 and 16 may be any types of devices, such as sensors, valves, transmitters, positioners, etc. and the I/O devices 18 and 19 may be any types of I/O devices conforming to any desired communication or controller protocol such as HART, Fieldbus, Profibus, etc.

In the process plant 10 of FIG. 1, the workstation 20 (which may be, for example, a personal computer) may be used by one or more operators to design the process control modules to be executed by the process controllers 12, and display routines to be executed by the workstation 20 (or other computers), and to communicate with the process controllers 12 so as to download such process control modules to the process controllers 12. Furthermore, the workstation 20 may execute display routines that receive and display information pertaining to the process plant 10 or elements thereof during operation of the process plant 10.

The workstation 20 includes a memory 34 for storing a plurality of applications 32 such as, for example, configuration design applications and user interface applications, and for storing data such as, for example, configuration data pertaining to the configuration of the process plant 10 and other data structures 32, which may be accessed by any authorized user (referred to herein as an operator) to view and provide functionality with respect to devices connected within the process plant 10.

While the entire plurality of data source applications 32 is illustrated as being stored in only one workstation 20, some of these data source applications 32 or other entities could be stored in and executed in other workstations or computer devices within or associated with the plant 10 such as, for example, workstation 22. Still further, the plurality of data source applications 32 may be located in different geographical locations from each other and/or the process plant 10, and adapted to communicate via any suitable communication network such as, for example, the Internet, other public network, and/or private network. In some embodiments the workstation 20 may be accessed via a remote computing device (not illustrated). In these embodiments, process plant 10 may include a wired or wireless network connection to the remote computing device. The network connection may be private or public, and may use any known networking technology.

The workstation 20 also includes a processor 36 that executes the plurality of applications 32 to enable an operator to design process control modules and other routines, and to download these process control modules to the process controllers 12 (or to other computers), or to collect and display information via display screen 37 from other data source applications 32 to the operator during operation of the process plant 10.

The present disclosure generally relates to providing dynamically linked graphical messages in a process control system, such as the process control system illustrated in FIG. 1. A dynamically linked graphical message may link and/or associate contents of a centralized database entry with a process control object via a hyperlink. The hyperlink may be any known type of hyperlink. In some embodiments, the hyperlink may be a dynamic hyperlink that includes an association between a process control object corresponding to a process control element and a knowledge object corresponding to a knowledge reference, where the hyperlink is established during a run-time of a display view that includes the process control object. Examples of dynamic hyperlinks may be found in co-pending U.S. patent application Ser. No. 12/565,272, the entire contents of which are incorporated by reference herein. The centralized database that includes the contents of the dynamically linked graphical message may typically be different from a database that stores information relating to a definition or configuration of the process control object (e.g., a configuration database). That is, the centralized database may be logically and, in some cases, physically separate or independent from the database that stores information relating to a definition or configuration of the process control object.

At run-time of a display view that includes a representation of the process control object is built, the hyperlink of the dynamically linked graphical message may be activated so that the display view may display an electronic sticky note image in the vicinity of or proximate to the representation of the process control object, where the electronic sticky note image includes some or all of the contents of the centralized database entry. In this manner, the electronic sticky note may serve as a graphical representation of the hyperlink between the contents of the centralized database entry and the process control object that is activated at run-time of the display view. In particular, the electronic sticky note image and the hyperlink are established at run time and do not need to be previously configured.

Further, the electronic sticky note image may be automatically displayed on any instance of any display view on any workstation or computing device of the process control system that exhibits a representation of the process control object. Once the hyperlink has been initially defined, its graphical representation (i.e., the electronic sticky note) may be displayed in the vicinity of or proximate to the representation of the process control object on any display on which the representation of the process control object is presented. No additional definition for the dynamically linked graphical message is required for separate instances, display views, workstations, etc.

Still further, if the process control object is a class object, the electronic sticky note may be automatically displayed in the vicinity of or proximate to a representation of any sub-class object of the class object. In this case, a separate, additional hyperlink corresponding to each sub-class object may be defined in conjunction with the dynamically linked graphical message, so that each sub-class object is associated with the content of the dynamically linked graphical message.

The present disclosure provides multiple advantages over current electronic sticky note methods and systems. Current electronic sticky notes are generally provided as an operating system service or as part of a shell program, and are typically tied to a file or application managed by the operating system of a particular computer. A current electronic sticky note usually is tied to a general computing application (e.g., photo editor, PDF generator, word processor, spreadsheet, etc.) and a specific file or target that is executable by the general computer application.

Furthermore, current electronic sticky notes are typically divorced from process control objects, specialized process control software, and process control systems. For example, with current electronic sticky notes, a first operator may be able to create a particular current electronic sticky note and enter content thereon regarding a device in the process control system, but the first operator is limited to tying the created sticky note to a generalized computer program, such as a word processor or a graphics program, or to a file produced by the generalized computer program that is localized to the particular computer or workstation at which the first operator is working. Often the generalized computer program and the created sticky note are each unaware of process control objects that are defined and manipulated within the process control system.

To distribute the locally-created sticky note, the first operator must first determine a set of appropriate recipients, and then email or electronically send the created sticky note to all other operators or workstations that may be interested in the subject device. Each recipient operator would then be required to read the mailed current electronic sticky note, perhaps open the generalized computing application to which it is tied at the recipient operator's corresponding computer or workstation, and take additional steps to ferret out the corresponding subject device(s) referred to in the current electronic sticky note that are under his or her span of control. If the first operator deletes the original current electronic sticky note, the deletion would be required to be communicated to the recipient operators in order to maintain consistency across views and workstations. Each recipient operator would then be required to take additional steps to ensure the deletion of his or her copy of the electronic sticky note.

Additionally, current types of electronic sticky notes do not have the ability to be perpetuated throughout a process control object class, save through configuration. For example, if the first operator created a current electronic sticky note for one type of valve, additional, separate current electronic sticky notes would need to be created during run-time for each instance of the type of valve and would need to be distributed to various workstations and/or display views. In other scenarios, the current electronic sticky notes need to be configured in order to be perpetuated throughout the process control system. Thus, using current electronic sticky note art in a process control environment is not only cumbersome but may lead to inconsistency, coordination issues and wasted time.

The dynamically linked graphical messages of the present disclosure do not suffer from these drawbacks. For example, one significant benefit provided by the dynamically linked graphical message is the linkage of the contents of an electronic sticky note image to a specific process control object in the process control system. Whenever the representation of the specific process control object is presented on any display view on any workstation or computing device associated with the process control system, the electronic sticky note image may also be concurrently displayed. Thus, with a single, defined dynamically linked graphical message, users or operators throughout the plant may be automatically be alerted to any necessary communication with respect to the associated process control object, irrespective of which display views or workstations are being used by the operators. The contents of the single, defined dynamically linked graphical message may conveniently appear in close proximity to the linked process control object, and may be consistently displayed across the process control plant. Users are not forced to manually integrate a nugget of communicated information with different instances of the specific process control object, with different workstations, or with different users. Users are no longer required to spend extra time and attention on communication efficiency and accuracy.

Additionally, not only do the dynamically linked graphical messages of the present disclosure provide the ability of their contents to be linked to the specific process control object, but they may also provide an ability of their contents to be linked throughout classes of process control objects without being required to be configured to the display view or process control object. A dynamically linked graphical message applied to a process control class object automatically may perpetuate linkages between each sub-class object of the process control class object and the message content at run-time of display views that include the sub-class objects. The present disclosure eliminates the need for additional steps to provide separate instances of the electronic sticky note for each sub-class object.

A further benefit of dynamically linked graphical messages is the storage of message contents in a centralized process control database, such as an electronic logbook, event historian database, continuous process database, or other centralized database. Current electronic sticky note contents are typically stored locally at an individual workstation or computer, as current electronic sticky notes are typically provided via an operating system service or shell program. Global administration and searching of all available current electronic sticky notes in a process control plant would require significant cost and messaging processing time to coordinate between individual workstations. The present disclosure, however, leverages inherent characteristics and functionality of available, centralized process control databases, thereby easily and cost-effectively providing a comprehensive, consistent location for all dynamically linked graphical messages in a process control system. Additionally, existing interfaces and functionalities of the available, centralized process control databases may be easily extended to administrate the dynamically linked graphical messages in the process control system. For example, existing centralized interfaces for searching and accessing the existing centralized databases from various workstations, such as an electronic logbook interface, may be leveraged to support dynamically linked graphical messages, and a new interface does not need to be developed. Back-up, archival, auditing, and other capabilities may also be easily extended to include dynamically linked graphical messages.

Indeed, the present disclosure provides for convenient administration of dynamically linked graphical messages via multiple avenues of user interface access. A user may leverage an existing process control system database user interface such as the aforementioned electronic logbook interface to administrate dynamically linked graphical messages. Additionally or alternatively, the user may use an existing process control object interface for accessing process control objects (such as from a library of process control objects, or from an icon of a particular process control object on a particular display view), and from that user interface point in the process control system, the user may create or otherwise manage dynamically linked graphical messages. In some cases, the user may administer dynamically linked graphical messages via a menu of dynamically linked graphical message administrative operations that may be generally available on any display view, e.g., a drop-down menu from a toolbar.

Figure 2A:
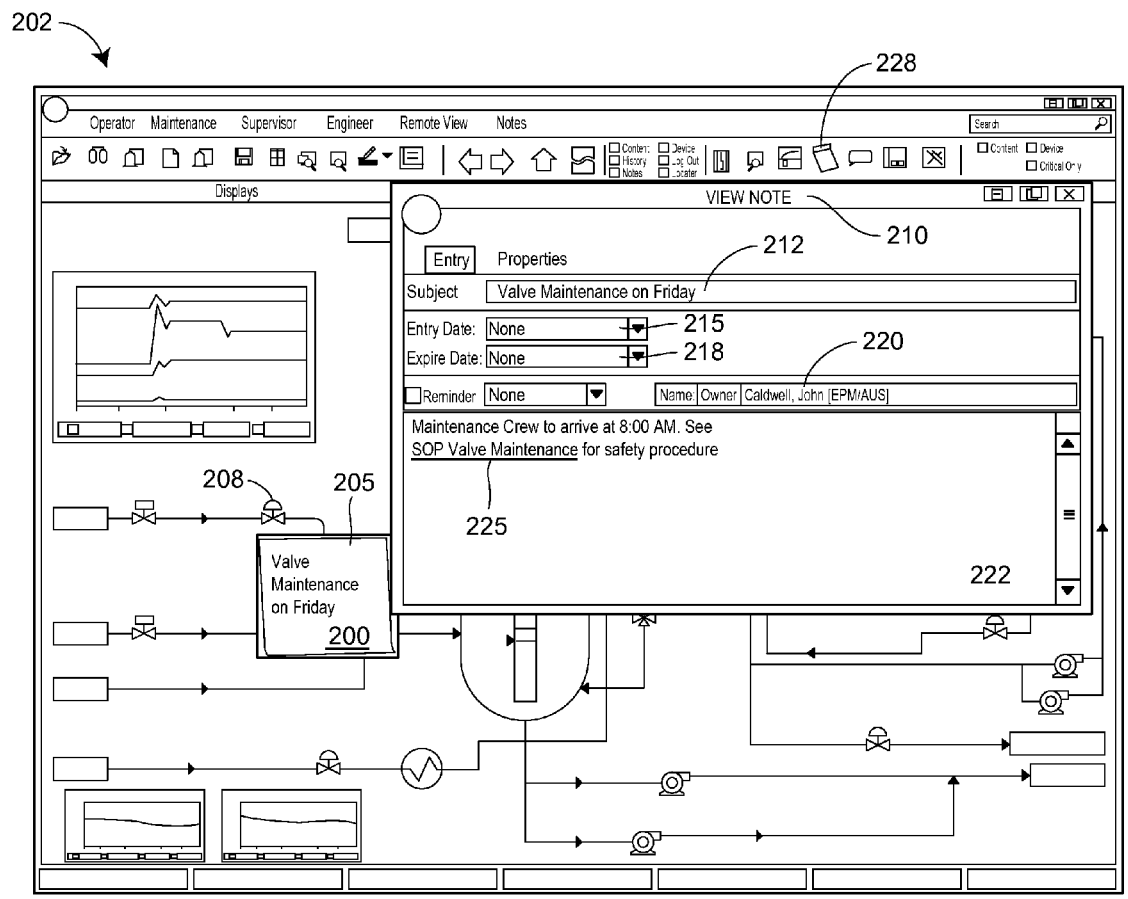
FIG. 2A is an example of a display view of a process control system that includes a dynamically linked graphical message and a corresponding details window.

FIG. 2A is an example of an appearance of a dynamically linked graphical message in a process control system of a process control plant, such as the process plant 10 of FIG. 1. The dynamically linked graphical message may appear as an electronic sticky note 200 on a display view 202 exhibited at a workstation or computing device in communication with the process control system. The electronic sticky note 200 may include a content field 205. In this example, the field 205 contains a text string "Valve Maintenance on Friday," but other alphanumeric and/or pictorial field contents may be displayed in the field 205. In FIG. 2A, the electronic sticky note 200 is illustrated as having a shape, form and color akin to a physical sticky note, but other shapes, forms, colors, and/or sizes of the electronic sticky note 200 may be possible.

The display view 202 may have thereon any number of representations of process control objects in the process control plant, such as process control objects corresponding to loops, devices, function blocks, etc. In the example screen shot illustrated in FIG. 2A, the display view 202 includes, among other representations, a representation 208 of a valve. In display view 202, the representation 208 of the valve is shown as a graphical icon, but in other embodiments, representations such as pictures, photos, or textual representations may be possible.

At run-time of the display view 202 (e.g, without requiring configuration), the dynamically linked graphical message may establish a hyperlink (not shown) that links the contents of the field 205 of the electronic sticky note 200 to a process control object corresponding to a valve represented by the valve icon 208. In some embodiments, the hyperlink may be a dynamic hyperlink, such as described in co-pending U.S. patent application Ser. No. 12/565,272. The contents 205 may be stored in a centralized database of the process control system, such as an electronic logbook, event database, historian database, knowledge object database, or other centralized database accessible by the process control system. After the hyperlink is established, the electronic sticky note 200 with its corresponding contents 205 may appear on the display view 202 in proximity to the valve icon 208.

Any display view on any computing device in communication with the process plant that displays the representation of valve 208 may also automatically display the electronic sticky note 200 thereon in proximity to the representation of valve 208. Thus, while an initial instance of the electronic sticky note 200 may be associated with the valve icon 208 in the display view 202, all other instances of appearance of the valve icon 208 (no matter on which display view or at which workstation) may automatically result in an appearance of the electronic sticky note 200 as well.

In some embodiments, if the specified process control object is a class object, when the hyperlink between the content of the electronic sticky note field and the class object is established, a separate additional hyperlink may also be automatically established (e.g., without requiring configuration) between the content of the electronic sticky note field and each different sub-class object of the class object during a run-time of a display view that includes the each different sub class object. For example, if an operator creates an electronic sticky note for a process control class object corresponding to a sensor model #6078 and enters as its contents "Recall replacements arriving Thursday, November 6$^{th}$," every sub-class object corresponding to the sensor model #6078 may automatically be linked to the content of the electronic sticky note field. Thus, in this example, an icon for particular sensor "A" of model #6078 on one display view and an icon for a different sensor "B" of model #6078 on a different display view may each exhibit the same electronic sticky note with the contents "Recall replacements arriving Thursday, November 6$^{th}$" in their respective vicinity. In this manner, all operators responsible for portions of the process control plant including any sensor of model #6078 may be automatically and easily notified (via the dynamically linked graphical message) of the recall replacements' arrival as a part of their normal views.

Turning back to FIG. 2A, contents of the field 205 of the electronic sticky note 200 (in FIG. 2A, "Valve Maintenance on Friday") may be stored as an entry in a centralized database of the process control system (not shown) that is different from a database that includes process control objects. For example, the centralized database may be logically, and in some cases, physically separate or independent from the database in which the process control objects are stored (e.g., a configuration database). In addition to the user-entered contents, the centralized database entry may include additional information or data corresponding to the dynamically linked graphical message, such as a timestamp of its creation, an identification of the creator, a category, and/or other information. Some or all of the contents of the centralized database entry may be viewed in response to a user-initiated action applied to the electronic sticky note 200, for example, a user-initiated click, mouse-over, touch-screen indication, voice command, keyboard sequence, cursor action, or the like.

For example, upon receipt of a user-initiated action (e.g., a click, mouse-over or other) applied to the electronic sticky note 200, a View Note window 210 (or equivalent) may appear, and may display thereon some or all of the contents of the corresponding centralized database entry. In the example of FIG. 2A, the View Note window 210 displays the contents of the field 205 of the electronic sticky note 200 in a subject or title field 212. The View Note window 210 may also include at least one of a creation date field 215, an expiration date or period field 218, an author field 220, or a message detail field 222. Contents of one or more of the fields 212-222 may be included in the field 205 of the electronic sticky note image 200. One or more of the fields 212-222 may include a link 225 to another process control object. In the View Note window 210, the link 225 is shown as a hyperlink to a standard operating procedure (SOP) knowledge object, but the link 225 may reference any process control object (knowledge object or otherwise) or may reference any data storage location in the process control plant. Of course, the fields 212-225 depicted in FIG. 2A are meant to be exemplary and not limiting. Alternatively or additionally, other fields may be possible.

In one embodiment, the centralized database entry corresponding to the dynamically linked graphical message may be an electronic logbook entry. The electronic logbook entry may store the contents of the field 205 of the electronic sticky note 200, and may also include an indication that the electronic logbook entry is a dynamically linked graphical message, such as in a field denoting a type of logbook entry. In this fashion, the electronic logbook entry for dynamically linked graphical messages may be distinguished from other types of logbook entries. Available electronic logbook user interfaces may be extended to provide access and administration of electronic logbook entries corresponding to dynamically linked graphical messages.

The example of the electronic logbook, however, is only one of many possible embodiments. Dynamically linked graphical messages may be defined in conjunction with any type of centralized database accessible by the process control system, such as historian databases, event databases, knowledge object databases, personnel databases, and others, so that the contents of the dynamically linked graphical message may be stored in any centralized database. In some embodiments, a content of the field 205 may be distributively stored across multiple centralized databases, such as, for example, when the field 205 includes both data from a specific event in an event database and a passage from a specific operator procedure in a knowledge object database. In some embodiments, an entry associated with a dynamically linked graphical message in a centralized database may include an indication that the entry corresponds to a dynamically linked graphical message type.

With further regard to FIG. 2A, various possible display properties of dynamically linked graphical messages may add user convenience. A user may be able to change a size, a shape, a color, a dynamic attribute, a dynamic visual characteristic, or other appearance characteristics of the electronic sticky note 200 via a selection or a modification. The user may be able to change an appearance of a single electronic sticky note, and/or the user may be able to define a combination of appearance characteristics for a category of dynamically linked graphical messages. For example, the user may define appearance characteristics of dynamically linked graphical messages to correspond to a type of logbook entry, e.g., a safety logbook entry may be represented by a flashing, red, octagonal shape, a maintenance log entry may be represented by a static, blue, hardhat shape, and an operator notes entry may be represented by a yellow, square shape with a handwritten font. Appearance characteristics may be alternatively or additionally defined for other categories as well, including categories pertaining to a physical location in the process control plant, a priority of the dynamically linked graphical message, an object class, or other categories. In some embodiments, permission to define and/or alter appearance characteristics of individual electronic sticky notes or categories of electronic sticky notes 200 may be based on a user identification or an authorization level of the user or user groups.

The user may be able to change a location of the electronic sticky note 200 on the display view 202. The user may be able to move the electronic sticky note 200 to a new location on the display view 202, for instance, when an electronic sticky note 200 is blocking the user's view of a critical part of the display view 202. The new location may be saved so that subsequent exhibitions of the display view 202 may show the electronic sticky note 200 in the new location. Alternatively or additionally, the electronic sticky note 200 may appear collectively with other electronic sticky notes 200 in a separate portion of the display view 202, such as on a toolbar or designated portion of the screen.

The user may be provided with a capability to bring one or more indicated electronic sticky notes 200 to a foreground of the display view 202 or to a foreground of a "stack" of electronic sticky notes, and to send the one or more indicated electronic sticky notes 200 to a background of the display view 202 or the "stack." A user may be able to minimize or restore an electronic sticky note 200.

Electronic sticky notes 200 may be automatically scalable in proportion to a size of a display. For example, electronic sticky notes 200 may be of a larger size on a flat-screen monitor and a smaller size on a hand-held wireless smart device. A user may be able to override the automatic scaling by resizing the electronic sticky note 200.

The user may be provided with a capability to hide and un-hide some or all electronic sticky notes on the display view 202. In some embodiments, a visibility indicator or toggle icon 228 may signify that one or more electronic sticky notes are defined but not visible. For example, toggling the icon or visibility indicator 228 may cause all available electronic sticky notes for the display view 202 to be hidden and unhidden. If the visibility indicator or toggle icon 228 indicates "hidden," the toggle icon 228 or some other visual indicator (not shown) may indicate to the user that the display view 202 has associated available electronic sticky notes even though none are displayed. In some embodiments, separate toggle icons 228 or other visual indicators may correspond to different categories or types of dynamically linked graphical messages. For example, a first toggle icon and/or visual indicator may correspond to a visibility of safety-related electronic sticky notes, another toggle icon and/or visual indicator may correspond to a visibility of operator-related electronic sticky notes, and a third toggle icon and/or visual indicator may correspond to a visibility of maintenance-related electronic sticky notes.

In some embodiments, a visibility of one or more categories of electronic sticky notes may be based on an authorization level of the user or group of users. For example, one or more categories of electronic sticky notes may be visible only for users below a supervisory level, other categories may be visible for only engineers, and still other categories may be visible for engineers and operators. The electronic sticky note 200 may even be defined as being privately visible between two individual users only.

In some embodiments, a visibility of one or more categories of electronic sticky notes may be based on a filter. For example, from a set of available, active electronic sticky notes, either a filtered subset may be displayed, or the inverse of the subset may be displayed. The filter may be based on, for example, an authorization level of a user, a physical area of the process plant, a priority, and/or some other specified criteria. Some or all filters may be may be user-specified, e.g., may be defined, selected and/or modified by a user. Some or all filters may be system-generated.

Figure 2B:
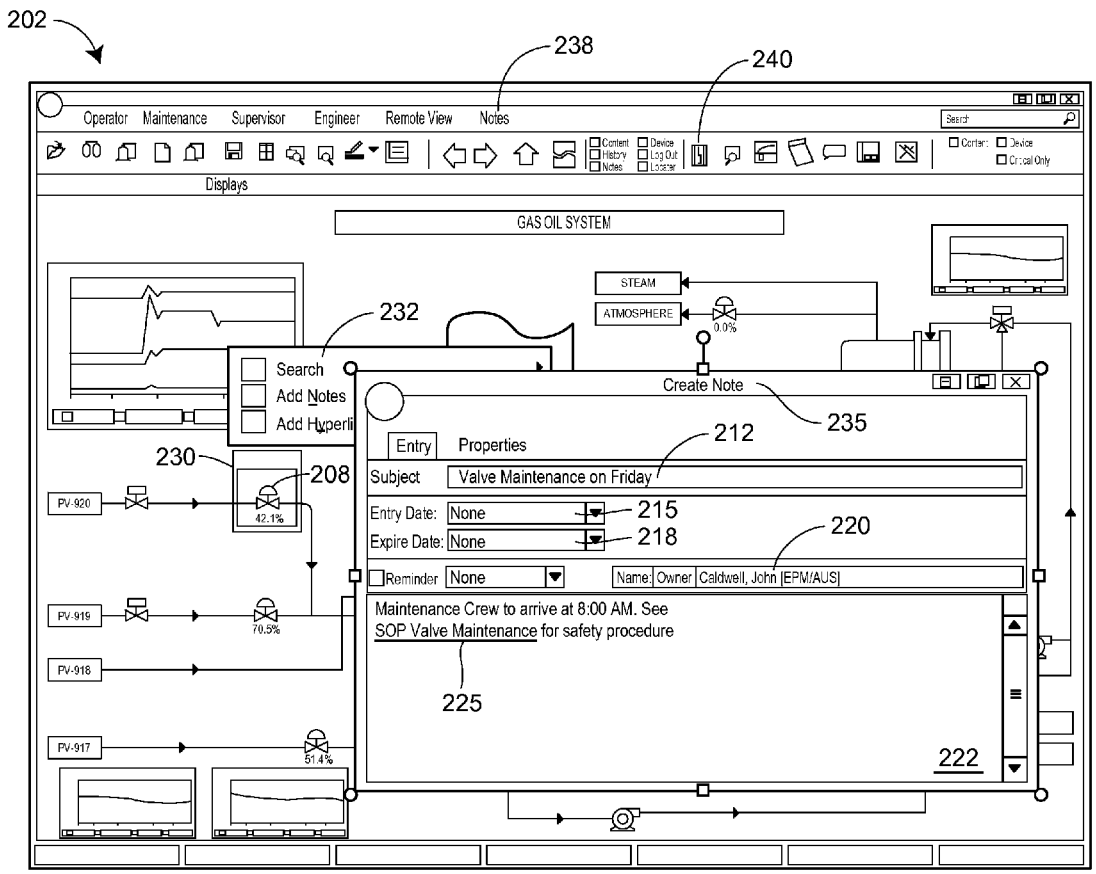
FIG. 2B is illustrates an embodiment of a screen shot taken during the creation of the dynamically linked graphical message of FIG. 2A.

FIG. 2B illustrates a screen shot taken during the creation of the dynamically linked graphical message 200 of FIG. 2A. FIG. 2B shows the display screen 202 of FIG. 2A, including the valve icon 208. In FIG. 2B, the user has indicated that he or she desires to create a dynamically linked graphical message for the valve icon 208, as shown by the highlighted box 230 around the valve icon 208. In response to the user-selection, a resulting user interface window 232 containing a selectable list of available dynamically linked graphical message administrative operations has appeared on the display screen 202. In this scenario, the user has selected an "Add Note" or "Create Note" operation (or equivalent) that has resulted in a corresponding Create Note window 235 being displayed on the display view 202. The Create Note window 235 may include one or more fields similar to those shown in the View Note window 210 of FIG. 2A, including the subject field 212, the creation date field 215, the expiration field 218, the author field 220, and the message detail field 222. FIG. 2B illustrates the user in the process of populating the fields 212-225 with desired information, including the hyperlink 225.

Generally, if the user desires to add a hyperlink to a field 212-222, such as the hyperlink 225, the user may select an "Add Hyperlink" or "Link" operation (or equivalent) from the window 232 or from a window resulting from a selection of an operation listed in the window 232, such as the "Create Note" window 235. Upon selection of the "Add Hyperlink" operation, a list of available hyperlinks in the process control system (not shown) (e.g., hyperlinks to process control objects, knowledge objects or other types of objects) may be displayed and the user may select one or more available hyperlinks from the list. The selected hyperlink(s) may be incorporated into the Create Note window 235 by any known means such as cut/paste, character entry, or by dragging and dropping the selected hyperlink(s) into the desired field.

After the user has finished entering all desired data into the Create Note window 235, the user may save the created note. The user may indicate a particular centralized database as a storage location, or a particular centralized database may be pre-defined or automatically selected. Upon saving the created note, the entered data may be populated into an entry of the centralized process control database, the hyperlink between the entry of the centralized process control database and the process control object corresponding to the valve icon 208 may be established, and the electronic sticky note 200 may appear on the screen in proximity to the valve icon 208 as shown in FIG. 2A. Additionally, upon saving the created note, hyperlinks between the entry of the process control database and any sub-class objects of the process control object corresponding to the valve icon 208 may also be automatically populated into the centralized process control database.

Other administrative operations (not shown) for dynamically linked graphical messages may also appear on the window 232 to provide the user with additional administrative operations with respect to dynamically linked graphical messages. For example, the window 232 may also contain operations such as a "Modify Note" operation, "Delete Note" operation, a search capability, an ability to set viewing, deletion and/or modification permissions, and the like.

A "Modify Note" operation (or equivalent) may allow the user to modify contents of the dynamically linked graphical message, such as any of the fields 212-225. Any modifications may be saved into the corresponding centralized database entry. Additionally, a "Modify Note" operation may allow the user to modify an appearance characteristic of the electronic sticky note 200, such as a color, a shape, a font, a size, a dynamic attribute, and the like.

A "Delete Note" operation (or equivalent) may allow the user to delete the dynamically linked graphical message. The deletion of the dynamically linked graphical message may result in a disappearance of the electronic sticky note image 200 from the display view 202 (and, therefore, from other display views as well). Deleting the dynamically linked graphical message may also result in the hyperlink between the process control object corresponding to the valve icon 208 and the content of the field 205 in the electronic sticky note image 200 being disabled. The contents of the fields 212-225, however, may still be maintained in the centralized database. Additional data may be added to the centralized database entry, such as an indication of the time of un-linkage (i.e., deletion of the dynamically linked graphical message), the process control object from which the entry was un-linked, an identity of a user that performed the un-linking, and other data. Similarly, when an expiration time, period, or time interval specified in the field 218 expires, the dynamically linked graphical message may follow a similar deletion procedure. If the user does not specify an expiration time or time interval, such as in the field 218, a default time or time interval may be used.

While the set of dynamically linked graphical message administrative operations shown in the window 232 of FIG. 2B is described as being accessed via a user icon selection, in other embodiments, the set of message administrative operations may be provided via a drop-down menu in the display screen, and may be accessed, for example, by clicking on a "Notes" drop-down menu 238 or by clicking on a "Notes" toolbar icon 240.

Furthermore, instead of being created from a display view at a workstation as illustrated in FIG. 2B, a dynamically linked graphical message may be created via an existing database management user interface of the process control system. For example, if an electronic logbook is used to store dynamically linked graphical messages, dynamically linked graphical messages may be created, modified, and otherwise administered via an available electronic logbook user interface. In this example, by using the available electronic logbook user interface, the user may create a new electronic logbook entry and may populate the new electronic logbook entry with a logbook entry type indicating the new electronic logbook entry is a dynamically linked graphical message. The newly created electronic logbook entry may contain data for populating fields of the dynamically linked graphical message, such as one or more of the fields 212-225 of the View Note window 210. In some embodiments, the newly created electronic logbook entry may contain fields other than those related to dynamically linked graphical messages.

The available electronic logbook user interface or other existing database user interface may further include a linking operation so that the user may designate, from the electronic logbook user interface or the other existing database user interface, a specific process control object to which the new electronic logbook entry or new database entry is to be linked. Similarly, the user interface may also include an unlinking operation so that a user may disassociate a particular electronic logbook entry or particular database entry with its corresponding process control object. Of course, the available electronic logbook interface is just one of many available, existing database management user interfaces through which dynamically linked graphical messages may be created. In fact, any available interface to any centralized database in which dynamically linked graphical message content may be stored may be used to create, modify and administer dynamically linked graphical messages.

In yet another embodiment for dynamically linked graphical message creation, a user may create a dynamically linked message from an existing user interface for administrating process control objects in the process control system. Via the existing process control object administration user interface, a user may be able to retrieve a list of process control objects and select one or more process control objects from the list for linking using dynamically linked graphical messages. For example, a user may be able to retrieve a list of all process control objects corresponding to knowledge references that are accessible by the process control system, such as Standard Operating Procedures, User Manuals, and the like. The user may select a particular knowledge reference (or its corresponding process control object) from the list, and may choose from a set of dynamically linked graphical message administrative operations, similar to those illustrated in the window 232 of FIG. 2B. For example, the user may select the "Add Notes" operation to create contents of a dynamically linked graphical message that include a reference to the selected knowledge reference or object, and may use a "Link Note" operation (not shown) to link the created contents to the selected knowledge object. In another embodiment, a "Link Note" operation may be performed by dragging-and-dropping a representation of the selected knowledge reference into a populated Create Note window 235, or by dragging-and-dropping the populated Created Note window 235 onto the representation of the knowledge reference. In fact, for any embodiment of user interfaces to dynamically linked graphical message administrative operations, some or all of the administrative operations may include drag-and-drop functionality.

FIG. 3A illustrates an embodiment of a dynamically linked graphical message database 300 that contains entries corresponding to created dynamically linked graphical messages. The dynamically linked graphical message database may serve as a "roadmap" to all active dynamically linked graphical messages available in the process control system, that is, to all dynamically linked graphical messages in the process control system that are currently defined with available (activated or non-activated) hyperlinks and associated process control objects. The dynamically linked graphical message database 300 may or may not be different (e.g., logically and/or physically separate) from one or more other centralized databases that store content information for dynamically linked graphical messages, and may or may not be different (e.g., logically and/or physically separate) from a configuration database that stores process control objects. At run-time, when a particular display view or equivalent is displayed, the dynamically linked graphical message database 300 may be accessed to determine which process control objects represented on the particular display view have associated, defined hyperlinks to be established.

Although the dynamically linked graphical message database 300 is illustrated in FIG. 3A as a table, the dynamically linked graphical message database 300 may take the form of any known database structure and technique. Any known database operations may be performed on the dynamically linked graphical message database 300. For example, any content of any field or fields of the database 300 may be searchable to produce shorter lists for viewing and/or selection, the database 300 may be sortable, and/or the database 300 may be subject to administrative operations, such as create, add, delete, modify, view, etc.

The database 300 may be located in the same or different databases as other centralized databases in the process control system (e.g., event database, historian database, electronic logbook, etc.), but, typically, the dynamically linked graphical message database 300 may be independent (e.g., logically independent and, in some cases, physically independent as well) of a configuration database, so that entries of the database 300 exclude configurations of process control objects and display views, in particular. The database 300 itself may be centralized and accessible from anywhere in the process control system. The database 300 may be remotely located and accessible via a private or public network. In particular, the database 300 may be accessible by both run-time and configuration applications or entities in the process control system.

Each entry of the dynamically linked graphical message database 300 may be created when a new dynamically linked graphical message is created. Each entry may contain, for example, at least one of an entry identifier 302, a time stamp indicating a time of creation 305, an indication of a process control object 308, an indication of a corresponding database entry to which the process control object is linked 310, a category of the dynamically linked graphical message 312, and/or one or more additional data or information fields 315. Of course, the attributes 302-315 are exemplary only. Embodiments of the dynamically linked graphical message database may have entries with only a subset of the attributes 302-315, and/or the dynamically linked graphical message database may have additional attributes (not shown). For example, an additional attribute may indicate for what level of authorization of user or user group an electronic sticky note is to be displayed, may indicate an expiration date/time of the corresponding message, or may indicate an identity of the author of the message.

Consider the example of entry 320 in dynamically linked graphical message database 300. The entry 320 links a process control object corresponding to valve model #6081 to the electronic logbook entry #6379. The entry 320 has a category of "Safety Procedure," and thus may be so distinguished on any display view, for instance, by displaying an electronic sticky note with a corresponding pre-defined characteristic (e.g., red, flashing octagon) next to every valve icon corresponding to every valve of model #6081.

Example entry 322 links a process control object representing a particular instance "B" of a display view #48 to an electronic logbook entry #7920. The entry 322 has a category of "Operator Notes" and may be distinguished as an "Operator Note," for instance, on the instance "B" of display view #48 by a yellow square-shaped electronic sticky note or other designation.

Example entry 325 links a process control alarm object corresponding to alarm 73A with an event #4622 in a historian database of the process control system. Suppose the alarm 73A has been intermittently occurring in a process control plant, and plant operators are having difficulty determining what is contributing to the intermittency of the alarm 73A. One operator may discover a causal relationship between the event #4622 and the alarm 73A. The operator may create the dynamically linked graphical message that links a process control object corresponding to alarm 73A and the event #4622. The created message may be entered into the dynamically linked graphical message database 300 as the entry 325 (shown in FIG. 3A).

Figure 3B:
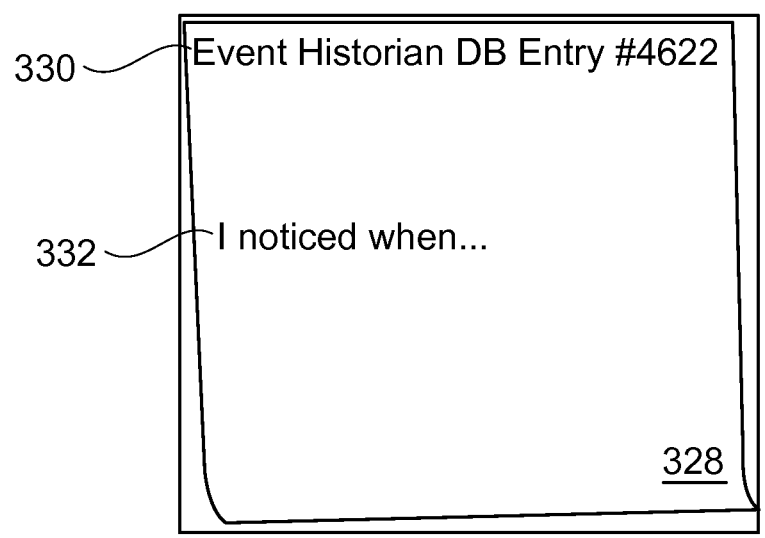
FIG. 3B is an example of an electronic sticky note image corresponding to an entry from the dynamically linked graphical message database of FIG. 3A.

A corresponding electronic sticky note 328 graphic of FIG. 3B corresponding to the entry 325 may be displayed whenever a representation of either the alarm 73A or the event #4622 is displayed. The electronic sticky note 328 may have a primary field 330 that displays a subject of the dynamically linked graphical message, e.g., an identification of the event #4622 and/or of the alarm 73A. An extra field 332 may also appear on the electronic sticky note 328 in which the user may enter additional text. The additional text may be stored in the optional field 315 for the entry 325 of FIG. 3A.

The database 300 of FIG. 3A demonstrates several interesting and beneficial characteristics about dynamically linked graphical messages. First, not all dynamically linked messages in a process control system are required to have their respective content stored in the same centralized process control database. In FIG. 3A, the entries 320 and 322 are stored in an electronic logbook, and the entry 325 is stored in a historian database. In fact, the dynamically linked graphical message database 300 may operate in conjunction with any and all centralized databases associated with the process control system.

Secondly, a process control object may be an object corresponding to a display view, or even may be an object corresponding to an instance of a display view. For example, corresponding to the entry 322, when instance "B" of display view #48 is accessed, an electronic sticky note linked to electronic logbook entry #7920 may be displayed. Other instances of the display view #48 would not display the electronic sticky note corresponding to the entry 322. Generally, a dynamically linked graphical message may be associated with any level of object class or sub-class within the process control system via the database 300 without requiring configuration of the dynamically linked graphical message.

Also, note that while the dynamically linked graphical message database 300 may generally provide a record of available hyperlinks in the process control system, the entries in the dynamically linked graphical message database 300 may be temporal. For example, an entry in the database 300 may be deleted when a corresponding dynamically linked graphical message is deleted. Even after a dynamically linked graphical message has been deleted and removed from the dynamically linked graphical message database 300, however, contents of the corresponding centralized database entry (e.g., electronic logbook entry #6379 for the entry 320, electronic logbook entry #7920 for the entry 322, and event database entry #4622 for the entry 325) may still be maintained in its respective centralized process control database.

Figure 4:
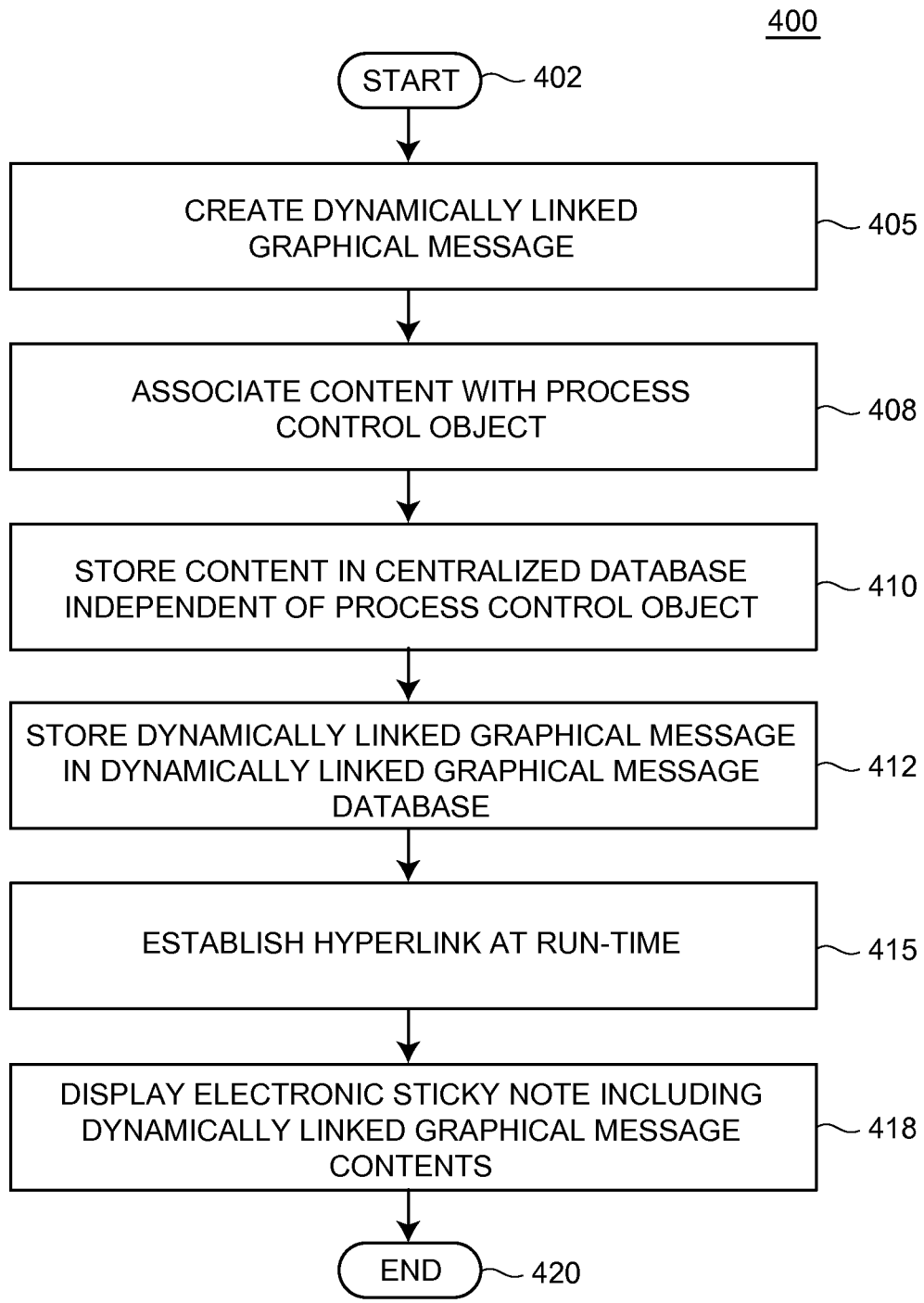
FIG. 4 is an embodiment of a method for providing dynamically linked graphical messages in a process control system.

FIG. 4 depicts an embodiment of a method 400 for providing a dynamically linked graphical message in a process control system. Embodiments of the method 400 may operate in accordance with embodiments of the process control plant 10 of FIG. 1, the dynamically linked graphical message and creation thereof illustrated in FIGS. 2A and 2B, and/or the dynamically linked graphical message database of FIG. 3A.

At a start 402 of the method 400, a dynamically linked graphical message including an identity of the dynamically linked graphical message and corresponding contents may be created 405. The dynamically linked graphical message may be created 405 by a user. In another embodiment, the dynamically linked graphical message may be automatically created 405 by the process control system, such as via a script. In yet another embodiment, the dynamically linked graphical message may be created 405 at configuration time of a process control object.

The vehicle via which the dynamically linked graphical message is created 405 may include an administrative operation, for example, in response a user selection of a "create" or "add" note operation or equivalent. The "create" or "add" note option may be one of a set of dynamically linked graphical message administrative operations, including "delete," "modify," "link," and other operations. The set of operations may be provided via a process control object user interface, such as when a process control object on a display view is selected (as illustrated in FIG. 2B), or when a process control object is selected from a list of available process control objects in the process control system. Alternatively or additionally, the set of operations for dynamically linked graphical messages may be provided via an available user interface to a centralized database of the process control system, such as an electronic logbook user interface or an available user interface to an event, continuous, batch or other type of centralized database. In some embodiments, the set of operations for dynamically linked graphical messages may be provided via a user interface screen on a display. For example, the set of operations may be provided via a drop-down menu or a selectable icon on the user interface screen. In some embodiments, the set of operations for dynamically linked graphical messages may be provided via a user interface particular to a dynamically linked graphical message database, such as the dynamically linked graphical message database 300 illustrated in FIG. 3A. In some embodiments, creation of the dynamically linked graphical message 405 includes storing the contents of the created message.

At block 408, content of the created dynamically linked graphical message (such as the content in one or more of the fields 212-225) may be associated or linked with a process control object in the process control system. The association or linking may be performed via a drag-and-drop operation, via a "link" operation selected from the set of administrative operations, via data entry, or via some other command. In some embodiments, linking the dynamically linked graphical message 408 includes storing the contents of the linked message, and in some cases, also includes storing an indication of the link to the process control object.

At block 410, the content of the created dynamically linked graphical message may be stored (if not done so already) in one or more centralized databases of the process control system, such as an electronic logbook, a historian database or some other centralized database. Typically, the centralized database of the process control system may be an existing, available centralized database separate from a configuration database, and the content may be stored in a location independent from a storage location of the process control object. For example, the process control object may be stored in a process control object or configuration database, but the content of the dynamically linked graphical message may be stored in an electronic document repository.

At block 412, the dynamically linked graphical object is stored as an entry in a dynamically linked graphical message database, such as in database 300 of FIG. 3A. The stored entry of the dynamically linked graphical message database may include an indication of the process control object and an indication of the centralized database entry in which the content of the dynamically linked graphical object is stored.

At run-time of a display view that includes a representation of the process control object (block 415), a hyperlink may be established between the process control object and the content of the dynamically linked graphical message stored in the centralized database entry (such as the content of one or more of the fields 212-225). At block 418, an electronic sticky note image may be presented or displayed on the accessed display view in proximity to the representation of the process control object. A field on the electronic sticky note image may display, via the hyperlink, a portion of the content from the centralized database entry.

In fact, at run-time of any display view that includes the representation of the process control object, the electronic sticky note may be presented or displayed in proximity to the representation of the process control object. Further, any display view including a representation of a sub-class object of the process control object may also present or display the electronic sticky note in proximity to the representation of the sub-class object. Finally, at block 420, the method 400 may end.

Figure 5:
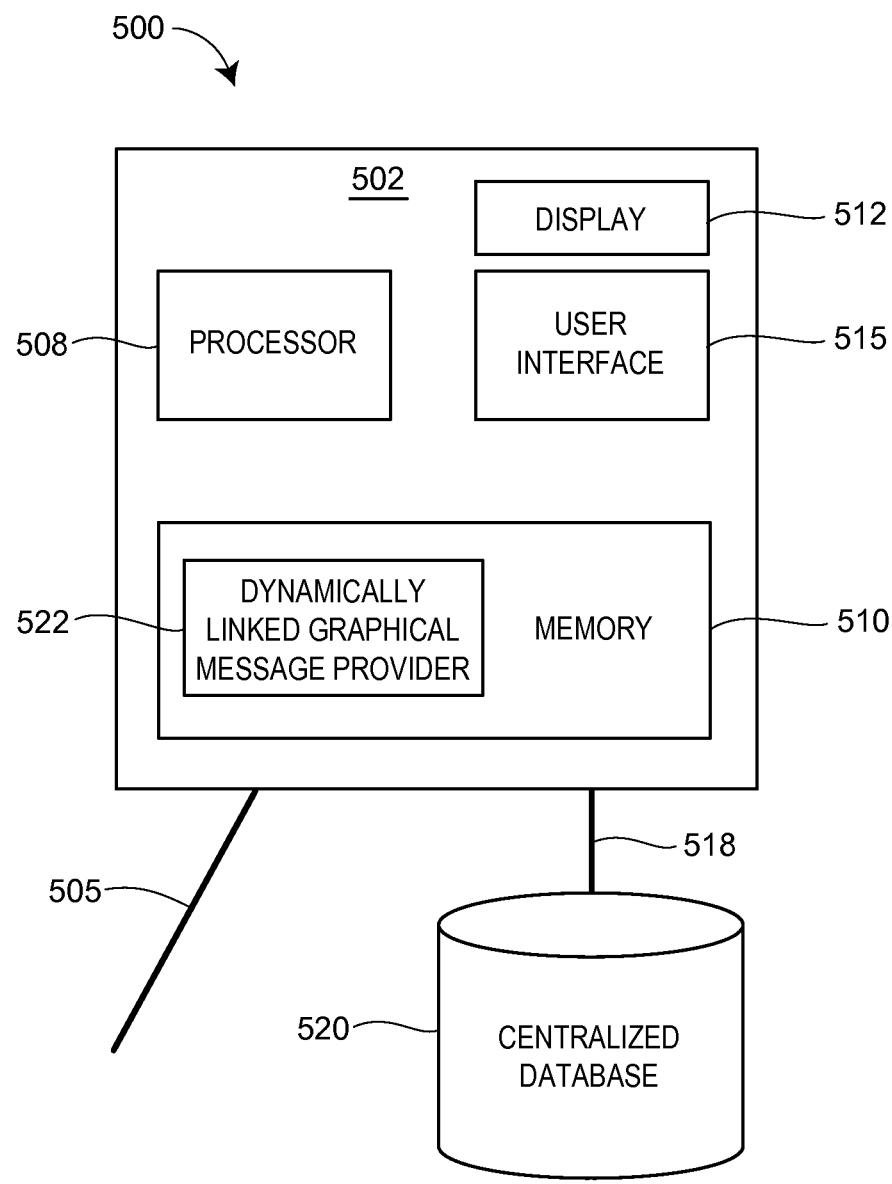
FIG. 5 depicts an embodiment of a dynamically linked graphical messaging system.

FIG. 5 depicts an embodiment of a dynamically linked graphical messaging system 500 for use in a process control system. Embodiments of the system 500 may be incorporated into embodiments of the process control system and process control plant illustrated in FIG. 1, or may operate in conjunction with embodiments of the process control system and the plant 10 illustrated in FIG. 1. Embodiments of the system 500 may operate in accordance with embodiments of the dynamically linked graphical message illustrated in FIGS. 2A and 2B, embodiments of the dynamically linked graphical message database 300 of FIG. 3A, and/or embodiments of the method 400 of FIG. 4, if desired.

The dynamically linked graphical messaging system 500 may include a computing device 502 which may be, for example, the host or the operator workstations 20, 22 of FIG. 1. In some embodiments, the computing device 502 may not be a part of a process plant or process control system itself, but may be communicatively coupled to a computer of the process plant control system such as the host or the operator workstations 20, 22 of FIG. 1 via a network link 505. The link 505 may be a direct or remote connection, and may be wired or wireless. The link 505 may provide a network connection to any public or private network. Generally, the network link 505 may be of any known networking technology known in the art.

The computing device 502 may have a processor 508 and a memory 510 accessible by the processor 508. The memory 510 may be a computer-readable storage medium with computer-executable instructions stored thereon that are executable by the processor 508. Although the computing device 502 illustrated in FIG. 5 shows only one processor 508 and one memory 510, in some embodiments, the computing device 502 may have multiple processors 508 and/or multiple memories 510. Likewise, although the memory 510 is illustrated as being contained within the computing device 502, in some embodiments, the memory 510 may be located external to the computing device 502, but still may be remotely or locally accessible by the processor 508.

The computing device 502 may include a display 512 and a user interface 515. For example, the display 512 may be a screen, and the user interface 515 may include at least one of a keyboard, a cursor, a touch screen, a voice-activation system, or the like. The display 512 and the user interface 515 may be partially or totally integrated, or may be communicatively coupled. Generally, the processor 508, memory 510, display 512 and user interface 515 may each take any respectively known form in the art.

The computing device 502 may encompass many different computing device configurations. For example, the computing device 502 may realized in hand-held devices, mobile phones, multi-processor systems, microprocessor-based or programmable consumer electronics, network PCs, mini-computers, mainframe computers, portable computing or communication devices, and or other computing devices capable of both visual display and direct or indirect communication with another computing device.

The computing device 502 may be communicatively coupled, via a link 518, to a centralized process control system database 520, such as the database 28 of FIG. 1. In embodiments where the computing device 502 is an entity of a process control system, such as one of the workstations 20, 22 of FIG. 1, the computing device 502 may be coupled to the centralized process control database 520 via the data highway 24 of the system 10. In embodiments where the computing device 502 is not an entity of a process control plant but is communicatively coupled to a process control plant system, the computing device 502 may be coupled via the link 518 to an intermediate gateway (not shown) of the process control plant system 10 in order to communicate with the database 520 (e.g., in FIG. 1, communicate with the database 28 over the data highway 24). In some embodiments, the link 505 and the link 518 may be the same link, and in other embodiments, they may be different links.

Although the centralized database 520 of the process control system is represented in FIG. 5 as a single database, reference 520 may represent more than one centralized database. For example, process control systems may include multiple databases in which process control data is recorded for historian purposes, such as a continuous history database, a discrete event database, and/or a batch historian database. The centralized database 520 may represent one or more historian databases used in a process control system. The centralized database 520 may represent other centralized databases, such as a document repository database, a knowledge object database, an electronic logbook, or others. The centralized database 520 may or may not include the dynamically linked graphical message database 300 of FIG. 3A. Typically, the centralized database 520 may be physically and/or logically separate from a configuration database in the process control system.

The computing device 502 may have a dynamically linked graphical message provider 522 stored in the memory 510. The dynamically linked graphical message provider 522 may be realized by computer-executable instructions, data structures, program modules, and other data that are stored in the memory 510 and that are executable and accessible by the processor 508. In a distributed computing environment, the computer-executable instructions, data structures, program modules, etc. of the dynamically linked graphical message provider 522 may be located in both local and remote memory storage devices, for example, in both a workstation 20, 22 of the process plant 10, and a computing device external to the process control plant system 10.

The dynamically linked graphical message provider 522 may include computer-executable instructions executed by the processor to provide embodiments of a dynamically linked graphical message, such as the dynamically linked graphical message described in FIG. 2A. For example, the dynamically linked graphical message provider 522 may create a dynamically linked graphical message, including a content stored in a centralized database 520 entry and a link to a process control object. Information corresponding to the dynamically linked graphical message may be stored in a dynamically linked graphical message database 300 that is resident in the memory 510 or resident in the centralized database 520 in a logically separate manner from other centralized database information. The dynamically linked graphical message provider 522 may establish a hyperlink between the content and the process control object at run-time of a display view, and may display an electronic sticky note on the display view in proximity to a representation of the process control object, where the electronic sticky note contains the contents of the centralized database 520 entry. Upon deletion of the dynamically linked graphical message, the dynamically linked graphical message provider 522 may remove the electronic sticky note from the display view and disable the hyperlink, but the contents of the centralized database entry may be maintained.

The dynamically linked graphical message provider 522 may also provide a set of administrative operations with which to administer dynamically linked graphical messages in the process control system (e.g., "Add," "Delete," "Link," "Modify," etc.), such as previously discussed with regard to FIGS. 2A and 2B. The dynamically linked graphical message provider 522 may administer embodiments of the dynamically linked graphical message database 300 of FIG. 3, including providing the database 300 itself, providing search mechanisms, populating and un-populating entries, and the like.

In fact, the dynamically linked graphical message provider 522 may support any embodiments of the dynamically linked graphical message of FIGS. 2A and 2B, any embodiments of the dynamically linked graphical message database 300 of FIG. 3A, and any embodiments of the method 400 of FIG. 4.

Although the disclosure describes example methods and systems including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the disclosure describes example methods and apparatus, persons of ordinary skill in the art will readily appreciate that the examples provided are not the only way to implement such methods and apparatus.

When implemented, any of the computer readable instructions or software described herein may be stored in any computer readable storage medium or memory such as on a magnetic disk, a laser disk, or other storage medium, in a RAM or ROM of a computer or processor, portable memory, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A dynamically linked graphical messaging system for use in a process control system of a process control plant, the dynamically linked graphical messaging system comprising:
a computing device in communication with the process control system, the computing device having a processor, a memory and a display;
a dynamically linked graphical message database that is logically independent from a centralized database and from a configuration database,
the dynamically linked graphical message database configured to store one or more entries respectively corresponding to one or more dynamically linked graphical messages, and
each of the one or more entries of the dynamically linked graphical message database configured to indicate a correspondence between a respective process control object defined in the configuration database and a respective content of a respective dynamically linked graphical message, the respective content stored in the centralized database; and
computer-executable instructions for a dynamically linked graphical message provider, the computer-executable instructions stored on the memory of the computing device and executable by the processor to:
create a dynamically linked graphical message, the dynamically linked graphical message including a hyperlink and an electronic sticky note image, the electronic sticky note image including a field;
store a content of the field of the electronic sticky note image in an entry of the centralized database that is accessible to the process control system;
associate the content of the field of the electronic sticky note image with a process control object that is configured in the process control system and defined in the configuration database;
store, in an entry of the dynamically linked graphical message database, an identification of the dynamically linked graphical message, an identification of the process control object corresponding to the dynamically linked graphical message, and an indication of the centralized database corresponding to the dynamically linked graphical message;
establish, during a run-time of a display view on the display and based on the entry of the dynamically linked graphical message database corresponding to the dynamically linked graphical message, the hyperlink between the content of the field and the process control object, the display view including a representation of the process control object; and
present, in conjunction with the representation of the process control object on the display view, the electronic sticky note image including the content of the field.

2. The dynamically linked graphical messaging system of claim 1, wherein:
the computing device is a first computing device, the display view is a first display view, the display is a first display, and the computer-executable instructions are first computer-executable instructions;
the dynamically linked graphical messaging system further comprises a second computing device in communication with the process control system; and
the second computing device includes second computer-executable instructions stored on a memory of the second computing device and executable by a processor of the second computing device to:
establish, during a run-time of a second display view on a second display of the second computing device, the hyperlink between the content of the field and the process control object; and
present, in conjunction with the representation of the process control object on the second display view, the electronic sticky note image including the content of the field.

3. The dynamically linked graphical messaging system of claim 1, wherein the process control object is a process control class object, and wherein the dynamically linked graphical message further includes a set of additional hyperlinks corresponding to sub-class objects of the process control class object, wherein the computer-executable instructions for the dynamically linked graphical message provider are further executable to:
associate the content of the field of the electronic sticky note image with a sub-class object;
establish, during a run-time of a particular display view that includes a representation of the sub-class object, an additional hyperlink between the content of the field and the sub-class object; and
present, in conjunction with the representation of the sub-class object, the electronic sticky note image including the content of the field.

4. The dynamically linked graphical messaging system of claim 1, wherein the entry of the centralized database comprises an indication that the entry of the centralized database corresponds to the dynamically linked graphical message.

5. The dynamically linked graphical messaging system of claim 1, wherein the centralized database is at least one of: an electronic logbook, a historian database, an event database, or a knowledge object database.

6. The dynamically linked graphical messaging system of claim 1, wherein the content of the field of the electronic sticky note image is stored across more than one centralized database.

7. The dynamically linked graphical messaging system of claim 1, further comprising:
a dynamically linked graphical message database that is logically independent from the centralized database;
an entry in the dynamically linked graphical message database corresponding to the dynamically linked graphical message; and
a user interface to the dynamically linked graphical message database wherein the computer-executable instructions are further executable to establish the hyperlink based on the entry in the dynamically linked graphical message database corresponding to the dynamically linked graphical message.

8. The dynamically linked graphical messaging system of claim 1, wherein the entry the dynamically linked graphical message database corresponding to the dynamically linked graphical message further includes at least one of: a creation time; an expiration period; an indication of the entry of the centralized database corresponding to the dynamically linked graphical message; an indication of an author, a category or type of the dynamically linked graphical message; an indication of a visibility corresponding to an authorization level of a user or group of users; or an additional information field.

9. The dynamically linked graphical messaging system of claim 8, wherein after the expiration period expires or after a deletion of the dynamically linked graphical message, the electronic sticky note image is removed from the display view, the hyperlink is disabled, the entry in the dynamically linked graphical message database is deleted, and the content is maintained in the centralized database.

10. The dynamically linked graphical messaging system of claim 1, wherein the display view includes a dynamically linked graphical message visibility indicator signifying that at least one dynamically linked graphical message is defined but not visible.

11. The dynamically linked graphical messaging system of claim 1, wherein the computer-executable instructions for the dynamically linked graphical message provider are further executable by the processor to provide a set of dynamically linked graphical message administrative operations including at least one of: create, modify, link, search, set permissions, or delete.

12. The dynamically linked graphical messaging system of claim 11, wherein the set of dynamically linked graphical message administrative operations is accessible via at least one of: a user interface for the centralized database, a user interface for the process control object, or a user interface for the display view.

13. The dynamically linked graphical messaging system of claim 12, wherein the modify dynamically linked graphical message administrative operation comprises at least one of: modifying a content of a selected dynamically linked graphical message, or modifying an appearance of a particular electronic sticky note image corresponding to the selected dynamically linked graphical message, and
wherein modifying the appearance of the electronic sticky note image comprises modifying at least one of: a shape, a color, a size, a dynamic visual characteristic, a location, or a font.

14. The dynamically linked graphical messaging system of claim 1, wherein the electronic sticky note image is at least one of:
re-sizeable;
able to be moved to a different location on the display;
able to be brought to a foreground of the display or sent to a background of the display;
able to be hidden and unhidden; or
scalable in proportion to a size of the display.

15. The dynamically linked graphical messaging system of claim 1, wherein:
the dynamically linked graphical message provider further displays a window in response to a user-initiated action corresponding to the electronic sticky note image presented on the display view;
the window includes the content of the field and at least one additional database field of the entry of the centralized database;
the at least one additional database field includes at least one of: an author field, a creation date field, a title field, a message detail field, and an expiration field; and
the user-initiated action comprises one of a user-initiated mouse action, a user-initiated cursor action, a voice command, or a user-initiated touch-screen action.

16. The dynamically linked graphical messaging system of claim 1, wherein:
the electronic sticky note image has a visual characteristic, the visual characteristic being at least one of: a color, a shape, a font, a size, or a dynamic attribute; and
the visual characteristic corresponds to at least one of: a dynamically linked graphical message type, a user identification, a physical location in the process control plant, a process control object class, or a priority of the dynamically linked graphical message.

17. The dynamically linked graphical messaging system of claim 1, wherein the computer-executable instructions for the dynamically linked graphical message provider are further executable to filter a visibility of available dynamically linked graphical messages on the display based on at least one of: an authorization level associated with a user, a physical area of the process control plant, or a user-specified criteria.

18. A dynamically linked graphical message provider stored on a memory and executable by a processor of a computing device corresponding to a process control system of a process control plant, the dynamically linked graphical message provider comprising:
computer-executable instructions stored on the memory and executable by the processor of the computing device to generate a dynamically linked graphical message, the dynamically linked graphical message including:
an electronic sticky note image presented in conjunction with a representation of a process control object of the process control system, the electronic sticky note image and the representation of the process control object presented on a display view on a display of a computing device, the computing device in communication with the process control system, a configuration of the process control object defined in a configuration database of the process control system, and the electronic sticky note image including a field;
a hyperlink established at run-time of the display view, the hyperlink linking a content of the field of the electronic sticky note image to the process control object, the content of the field being stored in an entry in at least one centralized database of the process control system; and
an entry in a dynamically linked graphical message database including an indication of the dynamically linked graphical message, an indication of the process control object, and an indication of the at least one centralized database, the dynamically linked graphical message database being logically independent of the at least one centralized database and of the configuration database; and the entry excluding the configuration of the process control object and a configuration of the display view.

19. The dynamically linked graphical message provider of claim 18, wherein:
the entry in the dynamically linked graphical message database further includes at least one additional database field selected from: a title field, an author field, a message detail field, a creation date field, an expiration field, and a second hyperlink to a second process control object configured in the process control system,
the at least one additional database field is displayed in a window that appears on the display view in response to a user-initiated action corresponding to the dynamically linked graphical message, and
the user-initiated action comprises one of a user-initiated mouse action, a user-initiated cursor action, a user-initiated voice activation, or a user-initiated touch-screen action.

20. The dynamically linked graphical message provider of claim 18, wherein the at least one centralized database comprises two or more centralized databases.

21. The dynamically linked graphical message provider of claim 18, wherein the electronic sticky note image is at least one of:
re-sizeable;
able to be moved to a different location on the display;

able to be brought to a foreground of the display or sent to a background of the display;
able to be hidden and unhidden; or
scalable in proportion to a size of the display.

22. The dynamically linked graphical message provider of claim 18, wherein the dynamically linked graphical message appears in conjunction with the representation of the process control object on each of two or more display views, wherein each of the two or more display views is presented on a different computing device in communication with the process control system.

23. The dynamically linked graphical message provider of claim 18, wherein:
the process control object is a class object;
the dynamically linked graphical message further includes a set of additional hyperlinks with each additional hyperlink linking the content of the field to a different sub-class object of the class object; and
the each additional hyperlink is established at run-time of a particular display view that includes a representation of the different sub-class object.

24. The dynamically linked graphical message provider of claim 18, wherein the dynamically linked graphical message is at least one of: created, viewed, modified, or deleted by a user.

25. The dynamically linked graphical message provider of claim 24, wherein the dynamically linked graphical message is at least one of: created, viewed, modified, or deleted by the user based on an authorization level.

26. The dynamically linked graphical message provider of claim 24, wherein the dynamically linked graphical message is at least one of: created, viewed, modified, or deleted by the user via at least one of: a user interface for the at least one centralized database, a user interface for the display view, or a user interface for the process control object.

27. The dynamically linked graphical message provider of claim 18, wherein the dynamically linked graphical message is deleted after a time expiration.

28. The dynamically linked graphical message provider of claim 18, wherein:
the electronic sticky note image has a visual characteristic, the visual characteristic being at least one of: a color, a shape, a font, or a dynamic attribute; and
the visual characteristic corresponds to at least one of: a type of the dynamically linked graphical message, an authorization level of a user, a physical location in the process control plant, a priority of the dynamically linked graphical message, or a user-specified criteria.

29. The dynamically linked graphical message provider of claim 28, wherein the visual characteristic is at least one of selectable or modifiable.

30. A method for providing dynamically linked graphical messages in a process control system of a process control plant, comprising:
creating a dynamically linked graphical message, the dynamically linked graphical message including a hyperlink and an electronic sticky note image, the electronic sticky note image including a field;
storing a content of the field of the electronic sticky note image in an entry of a centralized database accessible to the process control system;
associating the content of the field with a process control object having a definition that is stored in a configuration database of the process control system;
storing, in an entry of a dynamically linked graphical message database, an identification of the dynamically linked graphical message, an identification of the process control object corresponding to the dynamically linked graphical message, and an indication of the centralized database corresponding to the dynamically linked graphical message, the dynamically linked graphical message database being logically independent from the centralized database and from the configuration database, and the dynamically linked graphical message database excluding stored configurations of process control objects;
establishing, during a run-time of a display view on a display of a computing device in communication with the process control system and based on the entry of the dynamically linked graphical message database corresponding to the dynamically linked graphical message, the hyperlink between the content of the field and the process control object, the display view including a representation of the process control object; and
presenting on the display view, in conjunction with the representation of the process control object, the electronic sticky note image including the content of the field.

31. The method of claim 30:
wherein the display view is a first display view, the display is a first display, the computing device is a first computing device, and
the method further comprises:
establishing, during a run-time of a second display view on a second display of a second computing device in communication with the process control system, the hyperlink between the content of the field and the process control object, the second display view including the representation of the process control object; and
presenting on the second display view, in conjunction with the representation of the process control object, the electronic sticky note image including the content of the field.

32. The method of claim 30, further comprising providing a set of administrative operations for dynamically linked graphical messages, the set of administrative operations including at least one of: create message, modify message, delete message, set permissions for message, or link message.

33. The method of claim 32, further comprising providing the set of administrative operations via at least one of: a user interface for the display view, a user interface for the centralized database, or a user interface for administrating process control objects in the process control system.

34. The method of claim 30:
wherein associating the content of the field with the process control object comprises associating the content of the field with a process control class object, and
the method further comprises:
associating the content of the field of the electronic sticky note image with a sub-class object of the process control class object;
establishing, during a run-time of a particular display view that includes a representation of the sub-class object, an additional hyperlink between the content of the field and the sub-class object; and
presenting on the particular display view, in conjunction with the representation of the sub-class object, the electronic sticky note image including the content of the field.

35. The method of claim 30, wherein establishing the hyperlink comprises retrieving the content of the field from the centralized database, and wherein the centralized database is at least one of: an electronic logbook, a historian database, an event database, or a knowledge object database.

36. The method of claim 30, further comprising providing an indication signifying that the entry of the centralized database in which the content is stored corresponds to one or more dynamically linked graphical messages.

37. The method of claim 30, further comprising:

providing the dynamically linked graphical message database, and wherein the dynamically linked graphical message database excludes a configuration of the display view; and providing a user interface to the dynamically linked graphical message database including a set of database administration functions and a search capability.

38. The method of claim 37, further comprising providing one or more fields in the entry of the dynamically linked graphical message database corresponding to the dynamically linked graphical message, wherein the one or more fields each correspond to one of: a creation time; an expiration time; an indication of an entry of the centralized database; an indication of an author, a category or type; an indication of a visibility corresponding to an authorization level of a user or group of users; or an additional information field.

39. The method of claim 38, further including comprising deleting the dynamically linked graphical message based on at least one of a user command or a timer expiration, including:

removing the electronic sticky note image from the display view;

disabling the hyperlink;

deleting the entry from the dynamically linked graphical message database corresponding to the dynamically linked graphical message; and maintaining the content of the field in the centralized database.

40. The method of claim 30, further comprising providing a visibility indicator on the display view, the visibility indicator indicating that at least one dynamically linked graphical message is active but not visible on the display view.

41. The method of claim 40, further comprising:

filtering a set of active dynamically linked graphical messages associated with the display view; and displaying a set of electronic sticky note images corresponding to one of the filtered set or an inverse of the filtered set on the display view, wherein the filtering is based on at least one of: an authorization level associated with a user, a physical area of the process control plant, or a user-specified criteria.

* * * * *